United States Patent Office 2,804,381
Patented Aug. 27, 1957

2,804,381

HERBICIDES

John A. Garman, Baltimore, Md., and Donald K. George, State College, Miss., assignors, by mesne assignments, to Food Machinery and Chemical Corporation, New York, N. Y., a corporation of Delaware No Drawing. Application March 25, 1954,
Serial No. 418,773

24 Claims. (Cl. 71—2.5)

This invention relates generally to the destruction of plants and the selective control and inhibition of plant growth. It provides improved herbicides, or weed killers, which are especially useful in selectively destroying plants and selectively inhibiting plant growth. It also provides an improved method for controlling plant growth.

It had been proposed to destroy plants, or selectively discourage plant growth, by treating the soil, or the plants, or both, with certain carbamates such as a solution or an aqueous emulsion of isopropyl N-(3-chlorophenyl) carbamate, generally known to the industry by the term, CIPC.

This compound, CIPC, has been found effective as a general weed killer. However, it is usually desired that an herbicide be highly selective so that, while killing the weeds, or other undesired plants, it will not also adversely affect the desired crop. CIPC and other carbamates have not shown the desired degree of selectivity nor the essential margin of safety for many crop plants. The prior art compounds have been found to have too great a tendency to affect certain crop plants adversely under conditions required to kill the undesired plants.

It is an object of the present invention to provide herbicides of greater selectivity than those previously known. A further object is to provide the agricultural industry with a method of selectively controlling undesired plants, or inhibiting or destroying the growth of such plants, without adversely affecting the desired crop.

These and other objects, as will hereinafter appear, are accomplished by the present invention. It has been discovered that a certain specific class of chemical compounds show a surprisingly greater selectivity than CIPC for many of the common weeds. Especially do these compounds show outstanding action against crabgrass in post-emergent application in the presence of crop plants, particularly cotton.

More particularly, this invention concerns herbicidal compositions comprising the alkyl esters of 2-furfuryl carbamic acid, whose generic formula is as follows:

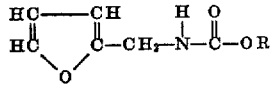

wherein R is an alkyl radical, advantageously of no more than six carbon atoms.

The compounds of the series having the above structural generic formula are stable under ordinary conditions and lend themselves readily to formulation of solutions, suspensions, aqueous emulsion, impregnated dusts, and the like. They are soluble in many of the common organic solvents, for instance, cyclohexanone, xylene, toluene, acetone, lower aliphatic alcohols, methylnaphthalenes, and the like. They may readily be prepared in relatively high concentrations in organic solvents for shipping and storing and conveniently dispersed in aqueous emulsion form or otherwise at the point of use.

Advantageously, stable concentrates of the respective compounds for use in forming aqueous emulsions may be prepared, for example, by mixing about 1 to 2 parts by weight of the carbamate, about 1 to 3 parts of organic solvent, and ½ to 1 part of a suitable emulsifying agent. At the point of use, this concentrate may be dispersed in from 4 to 100 parts of water to form an emulsion suitable for spraying. Preferably, the concentrate is diluted with about an equal volume of water immediately before the final dispersion for spraying.

A dusting powder may be prepared by impregnating 10 parts by weight of finely divided clay, or talc, or other inert solid carrier, with a solution of 12 parts of the carbamate, about two parts emulsifying agent, and 10 parts of acetone. The acetone is then evaporated and the residual impregnated dust may be further diluted with the same, or other carrier to 5% to 30% of active ingredients, by weight, and applied by means of conventional dusting equipment and methods. The residual impregnated dust may also be added to a suitable volume of water or other non-solvent fluent carrier with vigorous agitation and the resulting suspension sprayed in the usual manner.

These carbamates are highly selective and exhibit activity whether used as pre-emergent or post-emergent treatments. They appear to be especially valuable in post-emergent treatments. In post-emergent treatment, the herbicides are, of course, usually applied primarily to the growing plant. These carbamates show a general absence of toxicity toward crop plants in post-emergent use, especially in their lack of effect on cotton. In post-emergent treatment, however, the effects achieved are not necessarily due solely to the portion of the herbicide material which is subsequently retained on the growing plant parts since some effects are probably also achieved by some of the compound which actually reaches the soil and thereafter finds its way into the plant root system. In pre-emergent treatment, the herbicides are applied to the soil, usually the seeded soil, before the plants have emerged therefrom and usually at the time of crop seeding. Reference herein, and in the appended claims, to treating the "plant life" will be understood to include both the pre-emergent treatment, and the post-emergent treatment.

It is believed that the compounds herein shown and described are novel and heretofore unknown compositions of matter and it is contemplated to be within the scope of this invention to claim them as such.

The invention will be further described and illustrated by the following specific examples of its use and effectiveness. It will be understood that these examples are for illustrating the invention and are not to be considered as limiting the scope thereof. All parts are by weight unless otherwise specified.

In each of the tests of the following examples, the respective carbamates were applied in alcoholic solution in order to control more accurately the proportion of the herbicide used. Application of alcohol alone at many times the dosages used in these compositions shows no detectable phytotoxic effects. It will be further understood that these carbamates are equally effective in the form of solutions, suspensions, dry dusting powders, and aqueous emulsions.

In the following tests, the herbicidal effectiveness and selectivity of the respective compounds are expressed in the terms appearing, together with their significance, in the following tabulation:

No effect—N—0
Slight effect—S 1–3
Moderate effect—M 4–6
Severe effect—Sev 7–10
Total kill—Sev—10

EXAMPLE 1

To 32 parts of 2-furfurylamine and 28 parts of pyridine dissolved in approximately 400 ml. of benzene over a period of 30 minutes was added 41 parts of isopropyl chloroformate while the reaction temperature was maintained at 40–50° C. The reaction mixture was stirred overnight at room temperature, the precipitated pyridine hydrochloride was removed by filtration, and the filtrate was washed several times with cold water and dried over calcium chloride. The benzene was removed from the dried solution by vacuum stripping, and the residual product was distilled at reduced pressure to yield isopropyl N-2-furfuryl-carbamate boiling at 96–97° C. at 3 mm., $N_d^{25}$—1.4727; d—1.091. Molar refraction: Calc'd — 47.17; found—47.09. This compound gave the following elemental analysis for carbon and hydrogen: Calc'd for $C_9H_{13}NO_2$—carbon, 59.00, hydrogen, 7.15; found—carbon, 58.92, hydrogen 7.36.

EXAMPLE 2

Sec.-butyl N-2-furfuryl-carbamate was prepared by the method described above from corresponding proportions of 2-furfurylamine and sec.-butyl chloroformate except that aqueous sodium carbonate was employed instead of pyridine to neutralize the by-product hydrogen chloride. The product distilled at 118–120° C. at 3 mm., $N_d^{25}$—1.4713, and gave the following elemental analysis for carbon and hydrogen: Calc'd for $C_{16}H_{15}NO_3$—carbon, 60.89, hydrogen, 7.67; found—carbon, 60.78, hydrogen 7.27.

EXAMPLE 3

These tests were made with sec.-butyl N-2-furfuryl carbamate in both pre- and post-emergent manner. The seeds were planted in sand in metal pans. After planting, the soil in the pans was sprayed with an amount of an alcoholic solution of the herbicide sufficient to deposit thereon a definite amount of herbicidal compound per acre. The pans were watered at suitable intervals and maintained in a green house. Plant responses were noted 14 days after planting. The results are described in Table 1.

Table 1

| Plant species under test | Dosage, #/acre | Plant response Pre-emergent | Plant response Post-emergent |
|---|---|---|---|
| Peas | 11 | N-0 | N-0 |
|  | 14 | N-0 | S-1 |
| Corn | 11 | Sev-7 | S-1 |
|  | 14 | M-5 | S-1 |
| Barley | 11 | Sev-7 | N-0 |
|  | 14 | Sev-9 | N-0 |
| Rye grass | 11 | Sev-10 | N-0 |
|  | 14 | Sev-10 | N-0 |
| Green beans | 11 |  | N-0 |
|  | 14 | N-0 | N-0 |
| Soybeans | 11 | N-0 | M-4 |
|  | 14 | S-3 |  |
| Crabgrass | 11 | M-4 | Sev-10 |
|  | 14 | Sev-9 | Sev-10 |
| Cotton | 11 | M-5 | N-0 |
|  | 14 | S-3 | N-0 |

EXAMPLE 4

Tests similar to those of Example 3 were carried out with isopropyl N-2-furfuryl-carbamate and the results are shown in Table 2.

Table 2

| Plant species under test | Dosage, #/acre | Plant response Pre-emergent | Plant response Post-emergent |
|---|---|---|---|
| Peas | 13 | S-3 | S-2 |
|  | 19 | Sev-8 | S-2 |
| Corn | 13 | N-0 | S-1 |
|  | 19 | N-0 | S-2 |
| Barley | 13 | S-2 | N-0 |
|  | 19 | S-3 | N-0 |
| Rye grass | 13 | M-5 | N-0 |
|  | 19 | M-4 | S-1 |
| Green beans | 13 |  | N-0 |
|  | 19 | N-0 | N-0 |
| Soybeans | 13 | S-3 | N-0 |
|  | 19 | M-5 | N-0 |
| Fescues 31 | 13 | N-0 | N-0 |
|  | 19 | Sev-10 | S-3 |
| Crabgrass | 13 | N-0 | Sev-10 |
|  | 19 | S-2 | Sev-10 |

The extreme selectivity of this class of carbamate in post-emergent use against crabgrass especially in the presence of cotton and soybeans is clearly shown in both Tables 1 and 2. It is well known that, in each of these crops of major economic importance, crabgrass is one of the most serious weed pests.

What is claimed is:

1. As a new composition of matter, a carbamate represented by the structural formula:

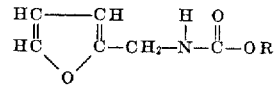

wherein R is an alkyl radical having from 1 to 6, incl., carbon atoms.

2. As a new composition of matter, sec.-butyl N-2-furfuryl-carbamate.

3. As a new composition of matter, isopropyl N-2-furfuryl-carbamate.

4. A selective herbicidal composition comprising a phytotoxic concentration of a carbamate represented by the structural formula:

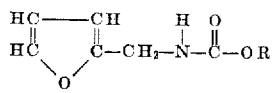

wherein R is an alkyl radical having from 1 to 6, incl., carbon atoms, in a carrier.

5. A selective herbicidal composition comprising a phytotoxic concentration of sec-butyl N-2-furfuryl-carbamate, in a carrier.

6. A selective herbicidal composition comprising a phytotoxic concentration of isopropyl N-2-furfuryl-carbamate, in a carrier.

7. A selective herbicidal composition consisting essentially of an aqueous emulsion of a carbamate represented by the structural formula:

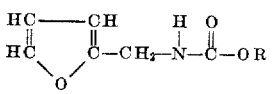

wherein R is an alkyl radical having from 1 to 6, incl., carbon atoms, said compound being present in said composition in a phytotoxic concentration.

8. A selective herbicidal composition consisting essentially an aqueous emulsion of sec-butyl N-2-furfuryl-carbamate, said compound being present in said composition in a phytotoxic concentration.

9. A selective herbicidal composition consisting essentially of an aqueous emulsion of isopropyl N-2-furfuryl-carbamate, said compound being present in said composition in a phytotoxic concentration.

10. A selective herbicidal composition consisting essentially of a carbamate represented by the structural formula:

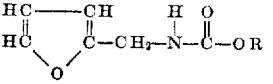

wherein R is an alkyl radical having from 1 to 6, incl., carbon atoms, and a non-solvent fluent carrier, said compound being present in said composition in a phytotoxic concentration.

11. A selective herbicidal composition consisting essentially of sec-butyl N-2-furfuryl-carbamate and a non-solvent fluent carrier, said compound being present in said composition in a phytotoxic concentration.

12. A selective herbicidal composition consisting essentially of isopropyl N-2-furfuryl-carbamate and a non-solvent fluent carrier, said compound being present in said composition in a phytotoxic concentration.

13. A selective herbicidal composition consisting essentially of a carbamate represented by the structural formula:

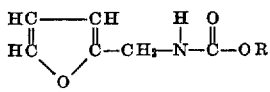

wherein R is an alkyl radical having from 1 to 6, incl., carbon atoms, in an organic solvent, said compound being present in said composition in a phytotoxic concentration.

14. A selective herbicidal composition consisting essentially of sec-butyl N-2-furfuryl-carbamate in an organic solvent, said compound being present in said composition in a phytotoxic concentration.

15. A selective herbicidal composition consisting essentially of isopropyl N-2-furfuryl-carbamate in an organic solvent, said compound being present in said composition in a phytotoxic concentration.

16. The method of selectively controlling plant growth comprising desired and undesired plant species, which comprises treating the plant growth with a carbamate represented by the structural formula:

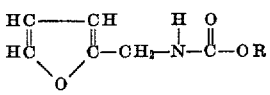

wherein R is an alkyl radical having from 1 to 6, incl., carbon atoms, in an amount and concentration which is phytotoxic to the undesired plant growth and substantially harmless to the desired plant growth.

17. The method of selectively controlling plant growth comprising desired and undesired plant species which comprises treating the plant growth with sec-butyl N-2-furfuryl-carbamate in an amount and concentration which is phytotoxic to the undesired plant growth and substantially harmless to the desired plant growth.

18. The method of selectively controlling plant growth comprising desired and undesired plant species which comprises treating the plant growth with isopropyl N-2-furfuryl-carbamate in an amount and concentration which is phytotoxic to the undesired plant growth and substantially harmless to the desired plant growth.

19. The method of selectively controlling plant growth comprising desired and undesired plant species in the same soil, which comprises treating the soil with a carbamate represented by the structural formula:

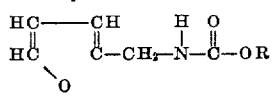

wherein R is an alkyl radical having from 1 to 6, incl., carbon atoms, in an amount and concentration which is phytotoxic to the undesired plant growth and substantially harmless to the desired plant growth.

20. The method of selectively controlling plant growth comprising desired and undesired plant species in the same soil, which comprises treating the soil with sec-butyl N-2-furfuryl-carbamate, in an amount and concentration which is phytotoxic to the undesired plant growth and substantially harmless to the desired plant growth.

21. The method of selectively controlling plant growth comprising desired and undesired plant species in the same soil, which comprises treating the soil with isopropyl N-2-furfuryl-carbamate, in an amount and concentration which is phytotoxic to the undesired plant species and substantially harmless to the desired plant species.

22. The method of selectively controlling plant growth comprising desired and undesired plant species, which comprises treating the foliage of the plant growth with a carbamate represented by the structural formula:

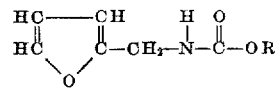

wherein R is an alkyl radical having from 1 to 6 carbon atoms, in an amount and concentration which is phytotoxic to the undesired plant species and substantially harmless to the desired plant species.

23. The method of selectively controlling plant growth comprising desired and undesired plant species, which comprises treating the foliage of the plant growth with sec-butyl N-2-furfuryl-carbamate, in an amount and concentration which is phytotoxic to the undesired plant species and substantially harmless to the desired plant species.

24. The method of selectively controlling plant growth comprising desired and undesired plant species, which comprises treating the foliage of the plant growth with isopropyl N-2-furfuryl-carbamate, in an amount and concentration which is phytotoxic to the undesired plant species and substantially harmless to the desired plant species.

References Cited in the file of this patent

"Weeds," January 1953, pages 48, 49 and 58.

UNITED STATES PATENT OFFICE
Certificate of Correction

Patent No. 2,804,881                            August 27, 1957

John A. Garman et al.

It is hereby certified that error appears in the printed specification of the above numbered patent requiring correction and that the said Letters Patent should read as corrected below.

Column 4, line 48, after the syllable "tially" insert —of—; lines 53 and 54, for "compopsition" read —composition—; column 5, claim 19, the formula should appear as shown below instead of as in the patent—

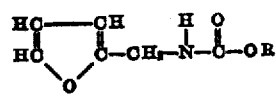

Signed and sealed this 4th day of February 1958.

[SEAL]

Attest:
KARL H. AXLINE,
*Attesting Officer.*

ROBERT C. WATSON,
*Commissioner of Patents.*